United States Patent
Basu et al.

(10) Patent No.: US 7,362,843 B2
(45) Date of Patent: Apr. 22, 2008

(54) SYSTEM AND METHOD FOR RECONSTRUCTION OF CONE BEAM TOMOGRAPHIC PROJECTIONS WITH MISSING DATA

(75) Inventors: Samit Kumar Basu, Niskayuna, NY (US); Bruno Kristiaan Bernard Deman, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 527 days.

(21) Appl. No.: 10/948,663

(22) Filed: Sep. 23, 2004

(65) Prior Publication Data
US 2006/0062443 A1    Mar. 23, 2006

(51) Int. Cl.
*A61B 6/03* (2006.01)
(52) U.S. Cl. .................... 378/4; 378/901; 382/131
(58) Field of Classification Search ............... 378/4, 378/901, 210; 382/131
See application file for complete search history.

(56) References Cited

U.S. PATENT DOCUMENTS

| | | | |
|---|---|---|---|
| 5,909,476 A * | 6/1999 | Cheng et al. | 378/4 |
| 6,101,236 A * | 8/2000 | Wang et al. | 378/4 |
| 6,282,257 B1 * | 8/2001 | Basu et al. | 378/15 |
| 6,389,097 B1 | 5/2002 | Bulkes et al. | |
| 6,477,221 B1 * | 11/2002 | Ning | 378/4 |
| 6,529,575 B1 * | 3/2003 | Hsieh | 378/4 |
| 6,560,308 B1 | 5/2003 | Zmora | |
| 2003/0161443 A1 * | 8/2003 | Xiao et al. | 378/210 |

FOREIGN PATENT DOCUMENTS

WO    WO9953440    * 10/1999

\* cited by examiner

*Primary Examiner*—Edward J. Glick
*Assistant Examiner*—John M Corbett
(74) *Attorney, Agent, or Firm*—Jason K. Kindtworth; Curtis B. Brueske

(57) ABSTRACT

A method for reconstructing image data from acquired tomographic projection data measurements is provided. The projection data measurements comprise one or more missing data measurements. The method comprises generating a coarse-resolution projection data set from the acquired projection data measurements and performing an iterative reconstruction on the coarse-resolution projection data set to generate a coarse-resolution reconstructed data set. Then, the method comprises reprojecting the coarse-resolution reconstructed data set to obtain one or more estimates for the one or more missing data measurements. The one or more estimated missing data measurements are then recombined with the acquired projection data measurements, to generate a recombined data set. Then, a direct reconstruction algorithm is applied to the recombined data set to generate the reconstructed image data.

19 Claims, 6 Drawing Sheets

SYSTEM AND METHOD FOR RECONSTRUCTION OF CONE BEAM TOMOGRAPHIC PROJECTIONS WITH MISSING DATA

STATEMENT REGARDING FEDERALLY SPONSORED RESEARCH & DEVELOPMENT

This invention was made with Government support under contract number DAMD 170220004, awarded by Department of Defense. The Government has certain rights in the invention.

BACKGROUND OF THE INVENTION

The present invention relates generally to the field of imaging systems. In particular, the invention relates to a system and method for reconstructing useful images from cone beam tomographic projections with missing data.

CT scanners operate by projecting fan shaped or cone shaped X-ray beams through an object. The X-ray beams are generated by an X-ray source, and are generally collimated prior to passing through the object being scanned. The attenuated beams are then detected by a set of detector elements. The detector element produces a signal based on the intensity of the attenuated X-ray beams, and the signals are processed to produce projections. By using reconstruction techniques, such as filtered backprojection, useful images are formed from these projections.

A computer is able to process and reconstruct images of the portions of the object responsible for the radiation attenuation. As will be appreciated by those skilled in the art, these images are computed by processing a series of angularly displaced projection images. This data is then reconstructed to produce the reconstructed image, which is typically displayed on a cathode ray tube, and may be printed or reproduced on film.

Direct reconstruction techniques, such as filtered backprojection, are generally fast and computationally efficient, since they allow reconstruction of a three-dimensional image data set in a single reconstruction step. Unfortunately, direct reconstruction techniques require that data be available on a regular grid of detector elements, conforming to some mathematically defined surface or volume. Furthermore, for proper operation of these direct reconstruction techniques, all of the detectors must be present and functional. In practice, as will be appreciated by those skilled in the art, CT systems may possess defective, missing, non-functional detector elements or gaps in-between detector elements. As a result, a number of CT projection data measurements may be missing and this in turn causes the projection data measurements to be unavailable on a regular set of coordinates. Therefore, direct reconstruction techniques cannot be directly applied to data from such CT systems.

A number of alternative techniques have been proposed to address the subject of missing projection data measurements. Some of these techniques include using a predefined value for the missing data, interpolating the missing values from available neighboring values, or using "complementary rays" obtained from other parts of an image scan. As will be appreciated by those skilled in the art, using a predefined value for the missing data results generally leads to severe artifacts and interpolation is possible only if the missing data regions are sufficiently small. Furthermore, the "complementary rays" technique works well in two-dimensional space, while its corresponding behavior in three-dimensional space is unsatisfactory.

Another technique that has been proposed to address the subject of missing data measurements is to perform an iterative reconstruction of the volume to be imaged. As will be appreciated by those skilled in the art, iterative reconstruction techniques improve image quality through an iterative step. In general, iterative reconstruction techniques start with an initial guess of the reconstruction volume, and then sequentially refine that guess by comparing data synthesized from this estimated volume with the actual measurements. Discrepancies between the synthesized and measured data are used to correct the estimated volume. This process continues until some threshold criteria are met. However, iterative reconstruction techniques require enormous amounts of computation and are not useful in practice unless the image volume to be reconstructed is small. Furthermore, iterative reconstruction techniques are much slower than direct reconstruction techniques requiring 10-100 times the computational cost as compared to direct reconstruction techniques.

Unlike direct reconstruction techniques, iterative reconstruction techniques can effectively handle missing projection data measurements since they do not require that all the projection data measurements be available on regular sets of co-ordinates. Therefore, there is a need for a technique that combines the flexibility provided by iterative reconstruction techniques with the speed of a direct reconstruction technique for reconstructing cone beam tomographic projections that comprise missing data measurements.

BRIEF DESCRIPTION OF THE INVENTION

Embodiments of the present technique address this and other needs. In one embodiment, a method for reconstructing image data from acquired tomographic projection data measurements is provided. The projection data measurements comprise one or more missing data measurements. The method comprises generating a coarse-resolution projection data set from the acquired projection data measurements and performing an iterative reconstruction on the coarse-resolution projection data set to generate a coarse-resolution reconstructed data set. Then, the method comprises reprojecting the coarse-resolution reconstructed data set to obtain one or more estimates for the one or more missing data measurements. The one or more estimated missing data measurements are then recombined with the acquired projection data measurements, to generate a recombined data set. Then, a direct reconstruction algorithm is applied to the recombined data set to generate the reconstructed image data.

In another embodiment, a computed tomography system for reconstructing image data from acquired tomographic projection data measurements is provided. The projection data measurements comprise one or more missing data measurements. The system comprises an X-ray source configured to project a plurality of X-ray beams through an object and a detector configured to produce a plurality of electrical signals in response to received X-ray beams from the source. The system further comprises a system controller configured to acquire and process the plurality of electrical signals to generate tomographic projection data measurements. The system controller is further configured to generate a coarse-resolution projection data set from the acquired projection data measurements; perform an iterative reconstruction on the coarse-resolution projection data set to generate a coarse-resolution reconstructed data set; reproject the coarse-resolution reconstructed data set to obtain one or more estimates for the one or more missing data measurements; recombine the one or more estimated missing data measurements with the acquired projection data measurements, to generate a recombined data set and apply a direct reconstruction algorithm to the recombined data set to generate the reconstructed image data.

DETAILED DESCRIPTION OF SPECIFIC EMBODIMENTS

Figure 1:
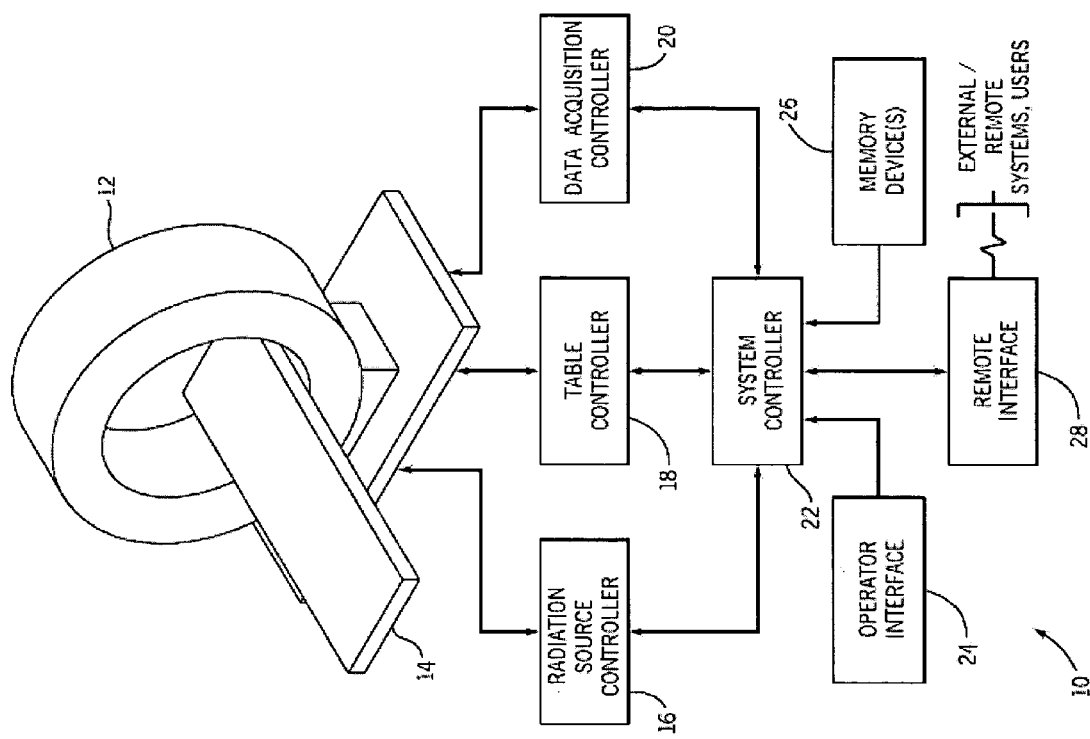
FIG. 1 is a diagrammatical representation of an exemplary CT system in accordance with aspects of the present technique.

Referring initially to FIG. 1, a computed tomography (CT) system is illustrated and designated generally by reference numeral 10. In the illustrated embodiment, the computed tomography (CT) system 10 is a flat-panel volumetric CT system designed to reconstruct cone beam tomographic projections with missing data measurements as will be described in greater detail below. The CT system 10 comprises a scanner 12 formed of a support structure and internally containing one or more stationary or rotational, sources of X-ray radiation (not shown in FIG. 1) and one or more stationary or rotational digital detectors (not shown in FIG. 1). The scanner is configured to receive a table 14 or other support for a patient, or, more generally, a subject to be scanned. The table can be moved through an aperture in the scanner to appropriately position the subject in an imaging volume or scanning plane during imaging sequences.

The system further includes a radiation source controller 16, a table controller 18 and a data acquisition controller 20, which may all function under the direction of a system controller 22. The radiation source controller 16 regulates timing for discharges of X-ray radiation which is directed from points around the scanner 12 toward a detector element on an opposite side thereof, as discussed below. In the case of stationary CT arrangements, the radiation source controller 16 may trigger one or more emitters in a distributed X-ray source at each instant in time for measuring multiple projection data. In certain arrangements, for example, the X-ray radiation source controller 16 may trigger emission of radiation in sequences so as to collect adjacent or non-adjacent measurements of projection data around the scanner. Many such projection data may be collected in an examination sequence, and data acquisition controller 20, coupled to detector elements as described below receives signals from the detector elements and processes the signals for storage and image reconstruction. In configurations described below in which one or more sources are rotational, source controller 16 may also direct rotation of a gantry on which the source or sources are mounted. Table controller 18 serves to appropriately position the table and subject thereon in a plane in which the radiation is emitted, or generally within a volume to be imaged. The table may be displaced between imaging sequences or during certain imaging sequences, depending upon the imaging protocol employed. Moreover, in configurations described below in which one or more detectors or detector segments are rotational, data acquisition controller 20 may also direct rotation of a gantry on which the detector or detectors are mounted.

System controller 22 generally regulates the operation of the radiation source controller 16, the table controller 18 and the data acquisition controller 20. The system controller 22 may thus cause radiation source controller 16 to trigger emission of X-ray radiation, as well as to coordinate such emissions during imaging sequences defined by the system controller. The system controller may also regulate movement of the table in coordination with such emission so as to collect projection data corresponding to volumes of particular interest, or in various modes of imaging, such as helical acquisition modes. Moreover, system controller 22 coordinates rotation of a gantry on which, either the source (s), detector(s) or both, are mounted in the case of rotating CT geometries or arrangements. The system controller 22 also receives data acquired by data acquisition controller 20 and coordinates storage and processing of the data. As will be described in greater detail below, in accordance with the present technique, the system controller is configured to generate a coarse-resolution projection data set from the acquired projection data measurements and perform an iterative reconstruction on the coarse-resolution projection data set to generate a coarse-resolution reconstructed data set. Further, the system controller is configured to reproject the coarse-resolution reconstructed data set to obtain estimates for missing data measurements and recombine the estimated missing data measurements with the acquired projection data measurements to generate a recombined data set. Finally, the system controller is configured to apply a direct reconstruction algorithm to the recombined data set to generate the reconstructed image data.

It should be borne in mind that the controllers, and indeed various circuitry described herein, may be defined by hardware circuitry, firmware or software. The particular protocols for imaging sequences, for example, will generally be defined by code executed by the system controllers. Moreover, initial processing, conditioning, filtering, and other operations required on the projection data acquired by the scanner may be performed in one or more of the components depicted in FIG. 1. For example, as described below, detector elements will produce analog signals representative of depletion of a charge in photodiodes positioned at locations corresponding to elements of the detector used for data acquisition. Such analog signals are converted to digital signals by electronics within the scanner, and are transmitted to the data acquisition controller 20. Partial processing may occur at this point, and the signals are ultimately transmitted to the system controller for further filtering and processing. In the same manner, image reconstruction may be accomplished by application specific integrated circuits residing in the system controller 22, by algorithms executed on the system controller 22, or by remote systems that can access the same data stored in memory device 26 as will be discussed in greater detail below.

System controller 22 is also coupled to an operator interface 24 and to one or more memory devices 26. The operator interface may be integral with the system controller, and will generally include an operator workstation for initiating imaging sequences, controlling such sequences, and manipulating projection data acquired during imaging sequences. The memory devices 26 may be local to the imaging system, or may be partially or completely remote from the system. Thus, imaging devices 26 may include local, magnetic or optical memory, or local or remote repositories for measured projection data for reconstruction. Moreover, the memory devices may be configured to receive raw, partially processed or fully processed projection data measurements for reconstruction.

System controller 22 or operator interface 24, or any remote systems and workstations, may include software for image processing and reconstruction. Therefore, some or all of the image processing may be performed remotely by additional computing resources based upon raw or partially processed image data. As will be appreciated by those skilled in the art, such processing of CT projection data may be performed by a number of mathematical algorithms and techniques such as Radon-based inversion reconstruction, Fourier-based reconstruction, direct reconstruction, maximum likelihood reconstruction, maximum a posteriori reconstruction, Bayesian reconstruction, least-squares reconstruction or algebraic reconstruction. A remote interface 28 may be included in the system for transmitting data from the imaging system to such remote processing stations or memory devices.

Figure 2:
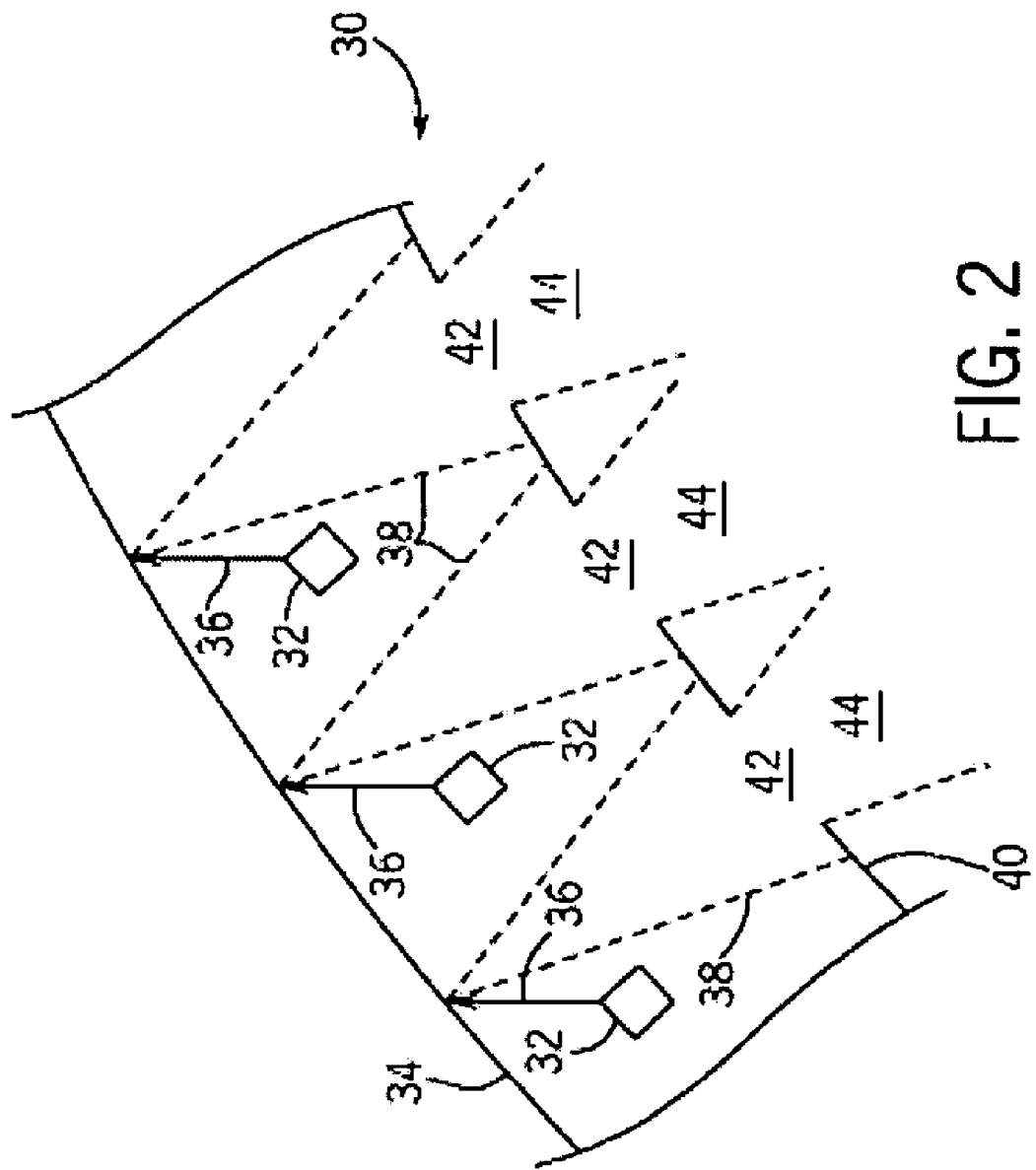
FIG. 2 is a diagrammatical representation of an exemplary distributed source for use with a system of the type illustrated in FIG. 1.

FIG. 2 illustrates a portion of an exemplary distributed X-ray source of the type that may be employed in the CT system 10 of FIG. 1. As shown in FIG. 2, in an exemplary implementation, the distributed X-ray source 30 may include a series of electron beam emitters 32 that are coupled to radiation source controller 16 shown in FIG. 1, and are triggered by the source controller during operation of the scanner. The electron beam emitters 32 are positioned adjacent to a distributed target 34. Upon triggering by the source controller, the electron beam emitters 32 may emit electron beams 36 toward target 34. The target 34, which may, for example, be a tungsten rail or element, emits X-ray radiation, as indicated at reference numeral 38, upon impact of the electron beams. In reflection mode, X-rays are meant to be produced primarily on the same side of the target as where the electrons impact. In transmission mode, X-rays are produced at the opposite side of the target. The X-ray beams 38 are directed, then toward a collimator 40, which is generally opaque to the X-ray radiation, but which includes openings or apertures 42. The apertures 42 may be fixed in dimension, or may be adjustable. Apertures 42 permit a portion of the X-ray beams to penetrate through the collimator to form collimated beams 44 that will be directed to the imaging volume of the scanner, through the subject of interest, and that will impact detector elements on an opposite side of the scanner.

A number of alternative configurations for emitters or distributed sources may, of course, be envisaged. Moreover, the individual X-ray sources in the distributed source may emit various types and shapes of X-ray beams. These may include, for example, fan-shaped beams, cone-shaped beams, and beams of various cross-sectional geometries. In accordance with the present technique, the X-ray beams comprise cone-shaped beams. Similarly, the various components comprising the distributed X-ray source may also vary. The emission devices may be one of many available electron emission devices, for example, thermionic emitters, carbon-based emitters, photo emitters, ferroelectric emitters, laser diodes, monolithic semiconductors, etc. Although a distributed source configuration is specifically mentioned here, any combination of one or more rotating-anode, stationary-anode, or distributed X-ray sources may be utilized in the CT system 10.

Figure 3:
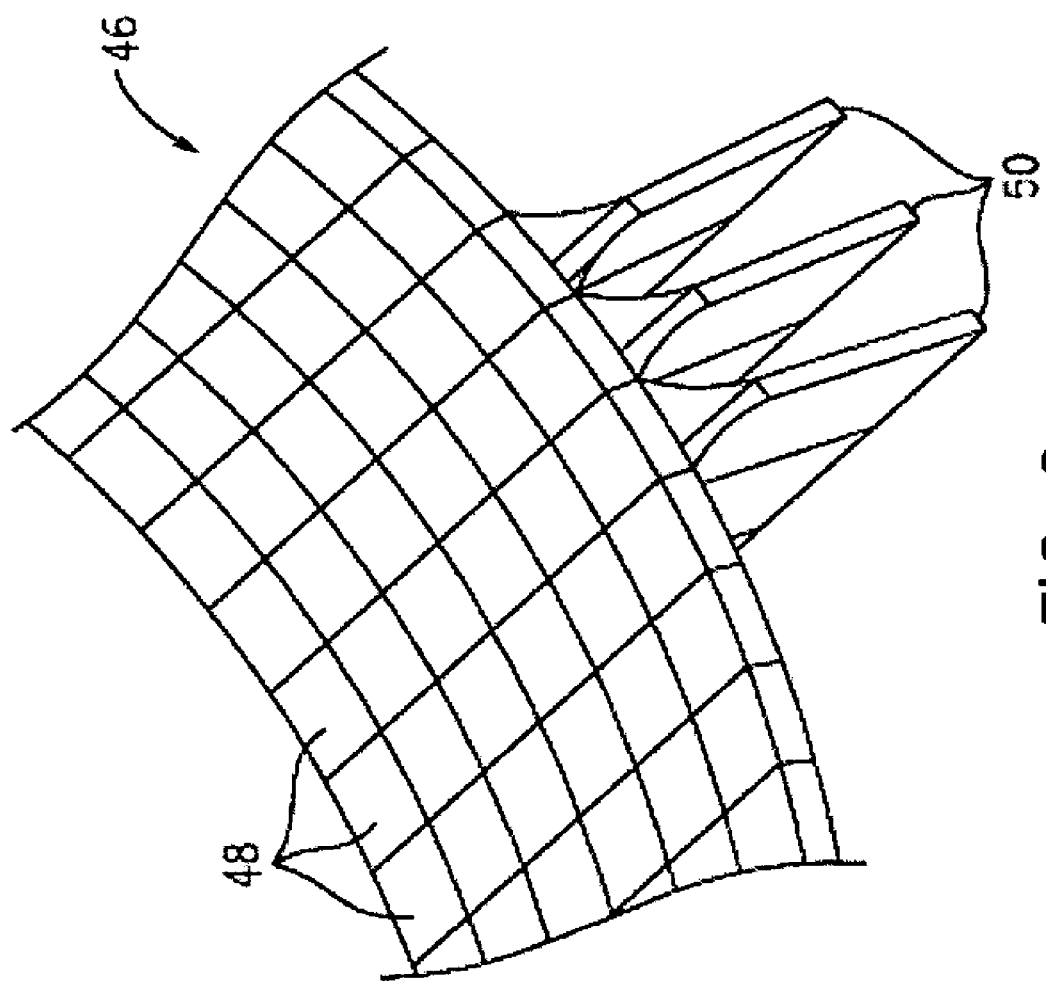
FIG. 3 is a diagrammatical representation of a portion of a detector for use with the system illustrated in FIG. 1.

FIG. 3 illustrates a portion of a detector that may be employed by the CT system 10 of FIG. 1. In accordance with an exemplary embodiment of the present technique, the detector is a flat-panel detector. As will be appreciated by those skilled in the art, a flat-panel detector includes a two dimensional array of photodiodes on an amorphous Silicon substrate that are connected in a matrix structure. Analog to digital converters are shared by groups of photodiodes, which are connected to the converters using a FET-based switching fabric. The flat-panel detector is coated with a scintillator material, such as Cesium-Iodide, which converts the X-ray photons into light photons, which are then captured and converted to charge by the array of photodiodes. Referring to FIG. 3, the detector arrangement may be generally similar to detectors used in conventional rotational CT systems, but can also be extended around a greater portion or the entire inner surface of the scanner in certain embodiments. Each detector may be comprised of detector elements with varying resolution to satisfy a particular imaging application. In general, the detector 46 includes a series of detector elements 48 and associated signal processing circuitry 50. These detector elements may be of one, two or more sizes, resulting in different spatial resolution characteristics in different portions of the measured projection data. Each detector element may include an array of photodiodes and associated thin film transistors. X-ray radiation impacting the detectors is converted to lower energy photons by a scintillator and these photons impact the photodiodes. A charge maintained across the photodiodes is thus depleted, and the transistors may be controlled to recharge the photodiodes and thus measure the depletion of the charge. By sequentially measuring the charge depletion in the various photodiodes, each of which corresponds to a pixel in the collected data for each acquisition, data is collected that indirectly encodes radiation attenuation at each of the detector pixel locations. This data is processed by the signal processing circuitry 50, which will generally convert the analog depletion signals to digital values, perform any necessary filtering, and transmit the acquired data to the system controller 22 of the imaging system 10 in FIG. 1 as described above. Although a detector configuration comprised of scintillation material and storage diodes is mentioned, any suitable detector for measuring X-rays may be used with the present technique.

Figure 4:
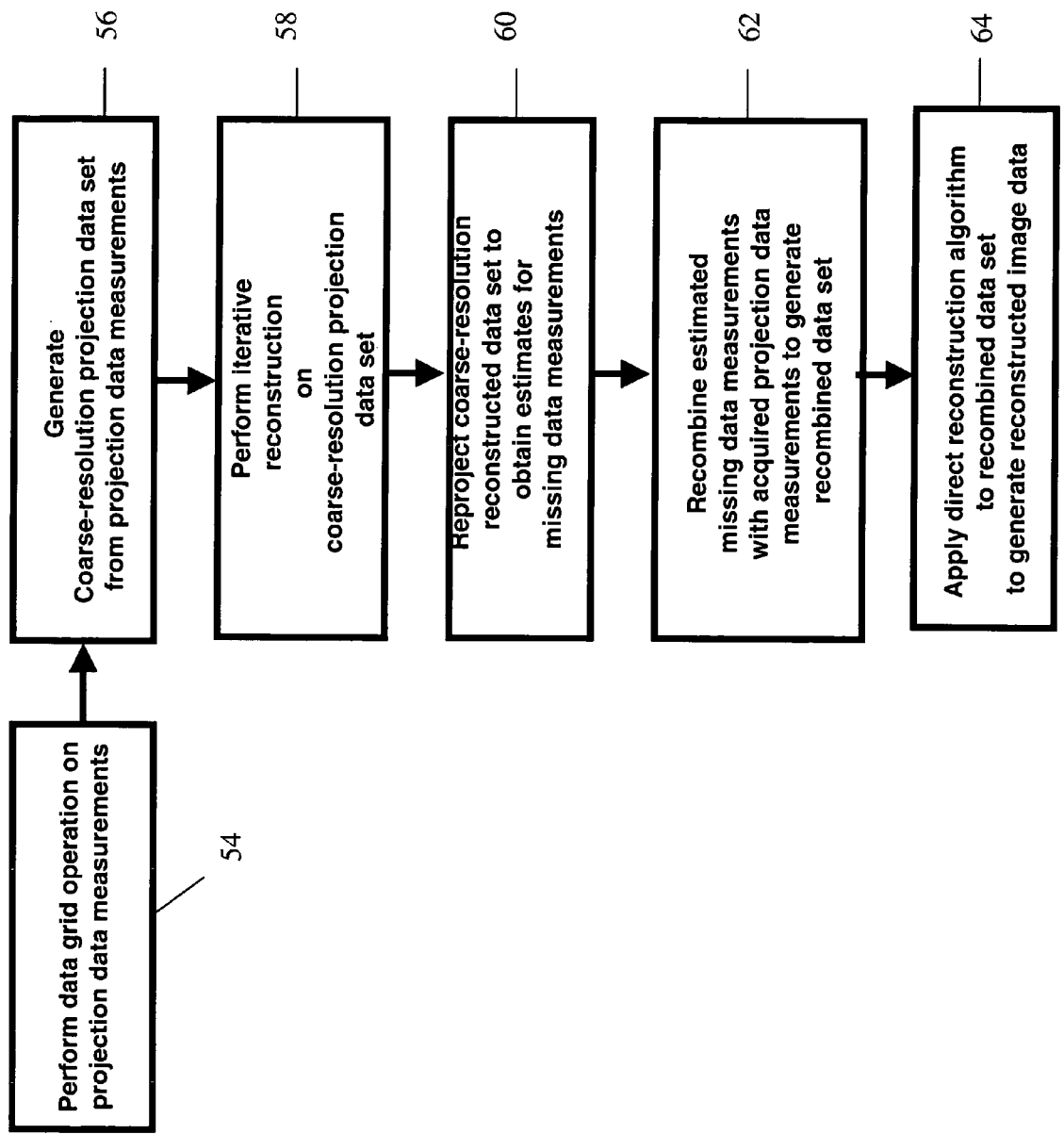
FIG. 4 is a flowchart that describes exemplary logic including exemplary steps for reconstructing projection data measurements comprising one or more missing data measurements, acquired by the CT system of FIG. 1 in accordance with one embodiment of the present technique.

FIG. 4 is a flowchart 52 that describes exemplary logic including exemplary steps for reconstructing projection data measurements, comprising one or missing data measurements, acquired by the CT system 10 of FIG. 1, in accordance with one embodiment of the present technique. In accordance with the present technique, the projection data measurements comprise cone-beam projections. However, the present technique is in general applicable to other types of geometries such as two-dimensional fan beam geometries or parallel-beam geometries as well.

In step 54, a data grid operation is performed on the projection data measurements. The data grid operation comprises mapping the acquired projection data measurements onto a regular co-ordinate grid system. In accordance with some alternate embodiments of the present technique, as will be described in greater detail with respect to FIG. 5 and FIG. 6 below, the data grid operation may be performed in an order that is different than what is indicated in FIG. 4. Also, as will be discussed in greater detail below, the data grid operation is typically performed prior to the step 64 of generating the reconstructed image, since direct reconstruction algorithms typically require that the image data be available on regular sets of coordinates prior to performing image reconstruction.

In step 56, a coarse-resolution projection data set is generated from the projection data measurements. As used herein, the term "coarse-resolution projection data set" refers to a data set comprising a reduced number of projection data measurements. In accordance with this embodiment, generating a coarse-resolution projection data set comprises reducing the number of effective measurements by performing a re-binning operation on the projection data measurements. The re-binning operation may be based on linear operations, such as smoothing the projection data measurements with a low-pass filter, and then decimating it to reduce the number of measurements. If a simple box-car type filter is used, then the re-binning operation comprises replacing each projection data measurement with a spatial average of its neighbors. In accordance with the present technique, the re-binning operation is generally selected so that the coarse-resolution projection dataset best represents the original dataset with as few measurements as possible.

In step 58, an iterative reconstruction is performed on the coarse-resolution projection data set to generate a coarse-resolution reconstructed data set. Various iterative reconstruction techniques are available and may be used in the present technique for performing the iterative reconstruction, such as for example, the least squares reconstruction technique or the maximum likelihood transmission reconstruction technique. As is known in the art, a typical iterative reconstruction algorithm starts with an initial guess for the reconstructed image, computes projections from the image data, compares the computed projections with the original measurements and updates the image data based on the difference between the calculated projections and the actual measurements. Also, as will be appreciated by those skilled in the art, iterative reconstruction techniques are generally used to generate high-quality reconstructed image data and do not require that all the projection data measurements be present in order to perform a high quality reconstruction.

In accordance with the present technique, an iterative reconstruction is performed on the projection data measurements at a much coarser resolution as compared to the initial resolution of the acquired projection data measurements, and the coarse-resolution reconstructed data set is then re-projected to obtain an estimate of the missing projection data measurements in the acquired set of projection data measurements as will be described in greater detail below. Since, in accordance with the present technique, the set of projection data measurements is initially reduced to perform a relatively small iterative reconstruction of the entire image volume of interest, the convergence speed and computational cost of each step comprising the iterative reconstruction is greatly reduced. In one embodiment of the present technique, the cost of each iteration in the iterative reconstruction technique is proportional to the number of pixels along a linear dimension of the reconstruction volume raised to the fourth power. Thus, for example, if the reconstructed volume is 512×512×512 voxels, the cost of each iteration (as measured in computer operations) is in the order of $512^4$, which is approximately 68 billion operations. On the other hand, if the coarse-resolution projection data set is chosen such that the reconstructed volume is only 64×64×64 voxels, the cost of each iteration is $64^4$, which is only 16 million operations. Hence, each iteration of the coarse-resolution projection dataset requires only $1/4096^{th}$ as much computation as an iteration using the original acquired data at the higher resolution. Therefore, for a given computing device, a four thousand fold increase in computation speed for the coarse-resolution projection dataset relative to the acquired dataset may be observed. Furthermore, as will be appreciated by one skilled in the art, for some iterative reconstruction algorithms, such as the Maximum Likelihood Transmission reconstruction (MLTR or ML-TRANS), the low spatial frequencies in the reconstruction volume converge faster than the high frequencies. As the coarse-resolution representation has fewer high frequency components, these algorithms may also experience convergence acceleration, meaning that fewer iterations are required to obtain a satisfactory solution. As is apparent to those skilled in the art, this improvement is in addition to the reduced computational cost per iteration.

In step 60, the coarse-resolution reconstructed data set is re-projected to obtain estimates for the missing data measurements. In accordance with the present technique, the process of performing the iterative reconstruction in step 58 and the process of performing a reprojection to estimate the missing data measurements in step 60 may be repeated for a pre-specified number of iterations, wherein after each iteration, a larger fraction of the missing data measurements is known.

In step 62, the estimated missing data measurements are recombined with the acquired projection data measurements to generate a recombined data set. In step 64, a direct reconstruction algorithm is applied to the recombined data set to generate the reconstructed image data. In accordance with the present embodiment, a filtered backprojection (FBP) technique such as the FeldKamp Davis Kreiss (FDK) reconstruction technique is used to generate the reconstructed image data. It may be noted that the generation of the recombined data set in step 62 is performed at the initial resolution (corresponding to the acquired projection data measurements) as compared to a coarse-resolution since the final reconstruction should contain information from the acquired projection data at their original resolution.

Figure 5:
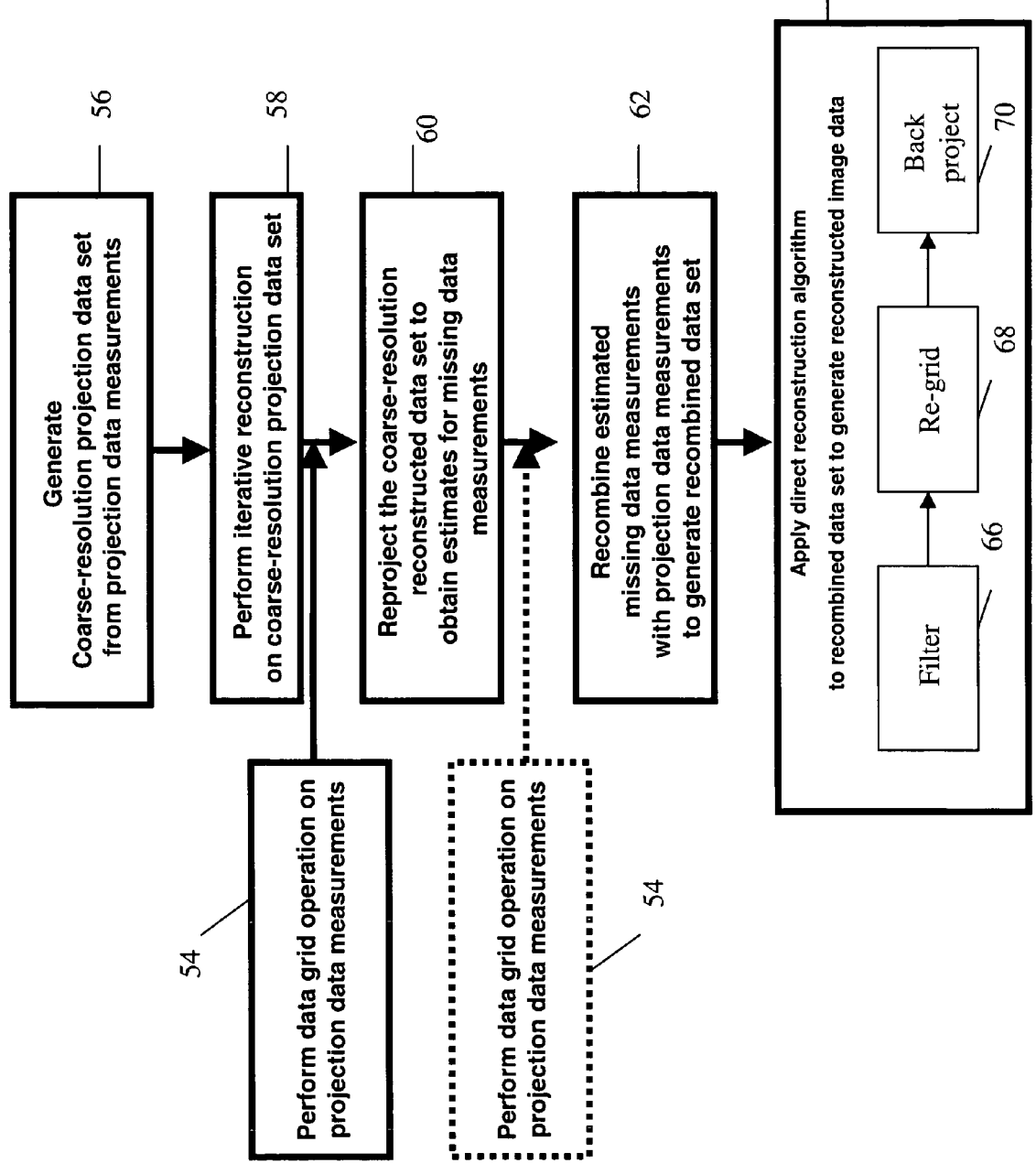
FIG. 5 is a flowchart including exemplary steps for reconstructing projection data measurements comprising one or more missing data measurements, acquired by the CT system of FIG. 1 in accordance with another embodiment of the present technique.

FIG. 5 is a flowchart 52 including exemplary steps for reconstructing projection data measurements comprising one or missing data measurements, acquired by the CT system 10 of FIG. 1, in accordance with another embodiment of the present technique. As may be observed from FIG. 5, the data grid operation 54 is performed subsequent to the step 58 of performing the iterative reconstruction and prior to the step 60 of obtaining estimates for the missing data measurements. In a variation of this embodiment, the data grid operation 54 may also be performed subsequent to the step 60 of reprojecting the coarse-resolution reconstructed data set and prior to the step 62 of recombining the estimated missing data measurements.

Figure 6:
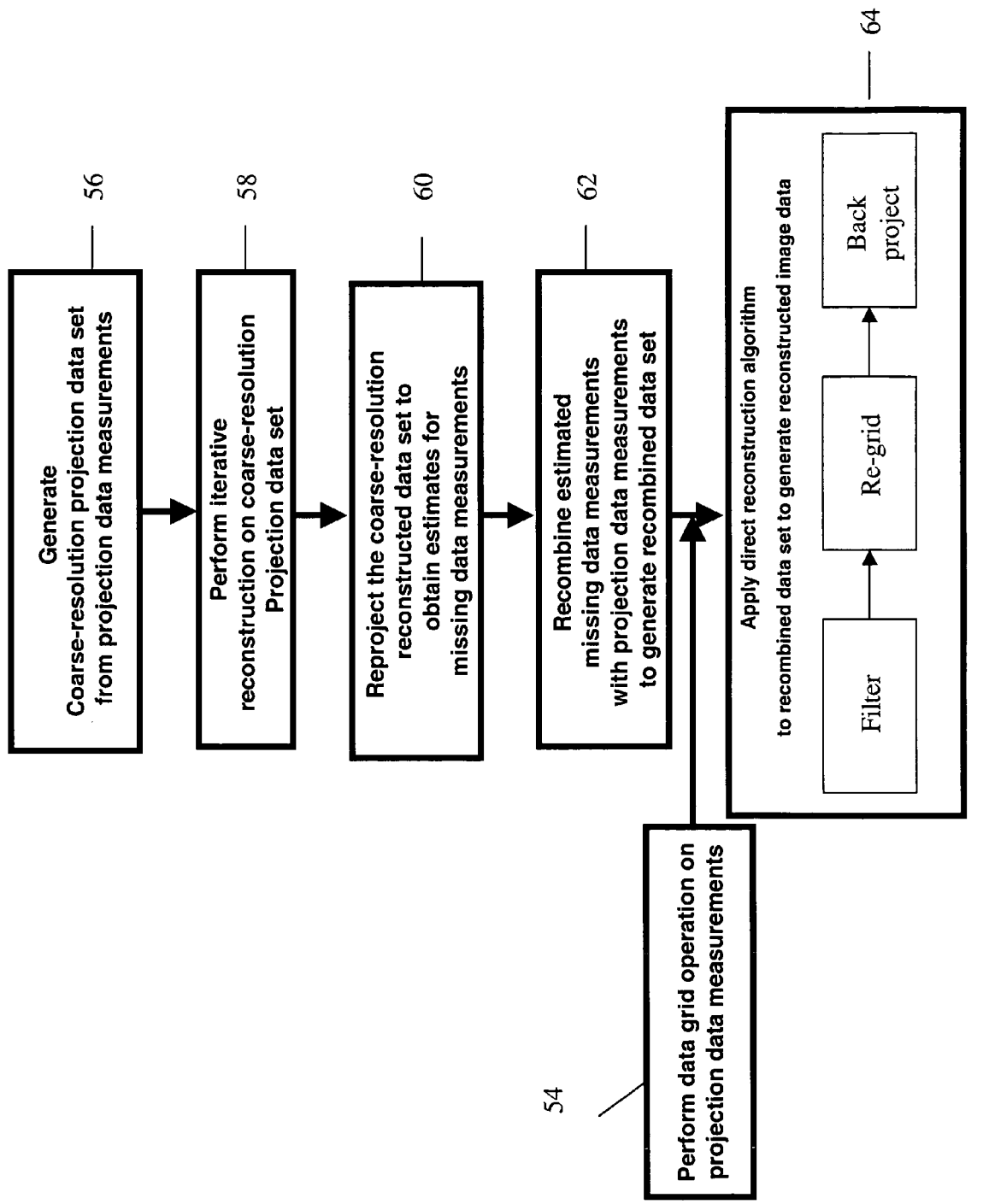
FIG. 6 is a flowchart including exemplary steps for reconstructing projection data measurements comprising one or more missing data measurements, acquired by the CT system of FIG. 1 in accordance with yet another embodiment of the present technique.

FIG. 6 is a flowchart 52 including exemplary steps for reconstructing projection data measurements comprising one or missing data measurements, acquired by the CT system 10 of FIG. 1 in accordance with yet another embodiment of the present technique. As may be observed from FIG. 6, the data grid operation 54 may be performed subsequent to the step 62 of recombining the estimated data measurements.

Referring again to FIG. 5 and FIG. 6, the direct reconstruction algorithm applied to the recombined data set to generate the reconstructed image data in step 64, additionally comprises the steps of filtering the projection data measurements in step 66, performing a re-grid operation on the projection data measurements at step 68 subsequent to the filtering step 66 and backprojecting the projection data measurements to form the reconstructed image at step 70. As mentioned above, direct reconstruction algorithms typically require that the image data be available on regular sets of coordinates. The re-grid operation in accordance with the present technique registers the recombined data set into a co-ordinate system corresponding to the acquired projection data measurements.

The embodiments illustrated and described above provide a technique for reconstructing cone beam tomographic projections with missing data measurements. As described above, the above technique combines the flexibility of iterative reconstruction techniques with the speed of a direct reconstruction technique for reconstructing tomographic projections that comprise missing data measurements. By performing a relatively small iterative reconstruction of the entire image volume of interest, the convergence speed and computational cost of each step comprising the iterative reconstruction is greatly reduced. The iterative reconstruction is performed on the projection data measurements at a much coarser resolution as compared to the initial resolution of the acquired projection data measurements, and the coarse-resolution reconstructed data set is then re-projected to obtain an estimate of the missing projection data measurements in the acquired set of projection data measurements. That is, in accordance with the present technique, the coarse-resolution data set is reprojected at every missing detector location thereby efficiently handling missing data measurements for a large number of missing data configurations.

Therefore, the above technique can efficiently handle large gaps in the projection data measurements unlike interpolation techniques that can handle gaps only when the missing data regions are sufficiently small. Also, the above technique can handle cone-beam geometries that in general cannot be handled using the "complementary ray" approach described above since, the technique of using "complementary rays" works well in two-dimensional space, while its corresponding behavior in three-dimensional space is unsatisfactory.

The reconstruction technique described above may be applied in cases wherein the object to be imaged falls partially outside the scan field of view wherein only data covering a central portion of the object is available. In addition, the reconstruction technique of the invention may be applied in cases where a portion of the X-rays is blocked due to strongly attenuating objects, such as in situations with metal artifacts. Furthermore, while the present technique is described herein with reference to medical imaging applications, it should be noted that the present technique is not limited to this or any particular application or environment. Rather, the technique may be employed in a range of applications, such as baggage and parcel handling and inspection, part inspection and quality control, and so forth, to mention but a few. In addition, the use of the present technique is not limited to volumetric flat-panel CT systems. For example, the present technique may also be applied for reconstruction of image data acquired in, for example, hybrid energy detector CT systems, PET and SPECT systems, traditional third and fourth generation CT systems, and so forth.

As will be appreciated by those skilled in the art, the embodiments and applications illustrated and described above will typically include or be performed by appropriate executable code in a programmed computer. Such programming will comprise a listing of executable instructions for implementing logical functions. The listing can be embodied in any computer-readable medium for use by or in connection with a computer-based system that can retrieve, process and execute the instructions. Alternatively, some or all of the processing may be performed remotely by additional computing resources based upon raw or partially processed image data.

In the context of the present technique, the computer-readable medium is any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for reconstructing image data from acquired tomographic projection data measurements comprising one or more missing data measurements, the method comprising:

generating a coarse-resolution projection data set from the acquired projection data measurements;

performing an iterative reconstruction on the coarse-resolution projection data set to generate a coarse-resolution reconstructed data set;

reprojecting the coarse-resolution reconstructed data set to obtain one or more estimates for the one or more missing data measurements;

recombining the one or more estimated missing data measurements with the acquired projection data measurements, to generate a recombined data set;

applying a direct reconstruction algorithm to the recombined data set to generate the reconstructed image data; and displaying a reconstructed image from the reconstructed image data.

2. The method of claim 1, wherein generating the coarse-resolution projection data set comprises generating a data set having a number of projection data measurements less than the number of acquired projection data measurements.

3. The method of claim 2, wherein generating the coarse-resolution projection data set further comprises performing a re-binning operation on the acquired projection data measurements, wherein the re-binning operation comprises smoothing and decimating the projection data measurements.

4. The method of claim 1, wherein generating the coarse-resolution projection data set impacts at least one of convergence speed and computational cost of each step comprising the iterative reconstruction.

5. The method of claim 1 further comprising performing a data grid operation on the acquired projection data measurements.

6. The method of claim 5, wherein the data grid operation comprises mapping the acquired projection data measurements onto a regular co-ordinate grid system.

7. The method of claim 5, wherein the data grid operation is performed prior to generating the coarse-resolution projection data set.

8. The method of claim 5, wherein the data grid operation is performed subsequent to the step of performing the iterative reconstruction on the coarse-resolution projection data set.

9. The method of claim 5, wherein the data grid operation is performed subsequent to the step of recombining the estimated missing data measurements.

10. The method of claim 1, wherein applying a direct reconstruction algorithm comprises filtering and backprojecting the recombined data set.

11. The method of claim 10 further comprising performing a re-grid operation subsequent to filtering the recombined data set.

12. The method of claim 11, wherein the re-grid operation registers the recombined data set into a co-ordinate grid system corresponding to the acquired projection data measurements.

13. The method of claim 1, wherein the steps of performing an iterative reconstruction and performing a reprojection to estimate the missing data measurements are repeated for a pre-specified number of iterations.

14. The method of claim 1, wherein the tomographic projection data measurements comprise cone-beam projections.

15. The method of claim 1, wherein the direct reconstruction algorithm is a filtered backprojection reconstruction algorithm.

16. The method of claim 15, wherein the direct reconstruction algorithm is performed using a FeldKamp Davis Kreiss (FDK) reconstruction algorithm.

17. The method of claim 1, wherein the iterative reconstruction is performed using a least squares reconstruction technique or a maximum likelihood transmission reconstruction technique.

18. A computed tomography system for reconstructing image data from acquired tomographic projection data measurements comprising one or more missing data measurements comprising:
an X-ray source configured to project a plurality of X-ray beams through an object;
a detector configured to produce a plurality of electrical signals in response to received X-ray beams from the source; and
a system controller configured to acquire and process the plurality of electrical signals to generate tomographic projection data measurements, wherein the system controller is further configured to generate a coarse-resolution projection data set from the acquired projection data measurements; perform an iterative reconstruction on the coarse-resolution projection data set to generate a coarse-resolution reconstructed data set; reproject the coarse-resolution reconstructed data set to obtain one or more estimates for the one or more missing data measurements; recombine the one or more estimated missing data measurements with the acquired projection data measurements, to generate a recombined data set; and apply a direct reconstruction algorithm to the recombined data set to generate the reconstructed image data.

19. At least one computer-readable storage medium storing computer instructions for reconstructing image data from acquired tomographic projection data measurements wherein the computer-readable storage medium is selected from the group consisting of a portable computer diskette, a random access memory, a read-only memory, an erasable programmable read-only memory, and a portable compact disc read-only memory, having one or more missing data measurements, the computer instructions comprising the steps of:
generating a coarse-resolution projection data set from the acquired projection data measurements;
performing an iterative reconstruction on the coarse-resolution projection data set to generate a coarse-resolution reconstructed data set;
reprojecting the coarse-resolution reconstructed data set to obtain one or more estimates for the one or more missing data measurements;
recombining the one or more estimated missing data measurements with the acquired projection data measurements, to generate a recombined data set;
applying a direct reconstruction algorithm to the recombined data set to generate the reconstructed image data; and
displaying a reconstructed image from the reconstructed image data.

\* \* \* \* \*